March 25, 1958 — K. M. GAVER ET AL — 2,828,336
PROCESS FOR TREATING GLUTEN
Filed May 8, 1956
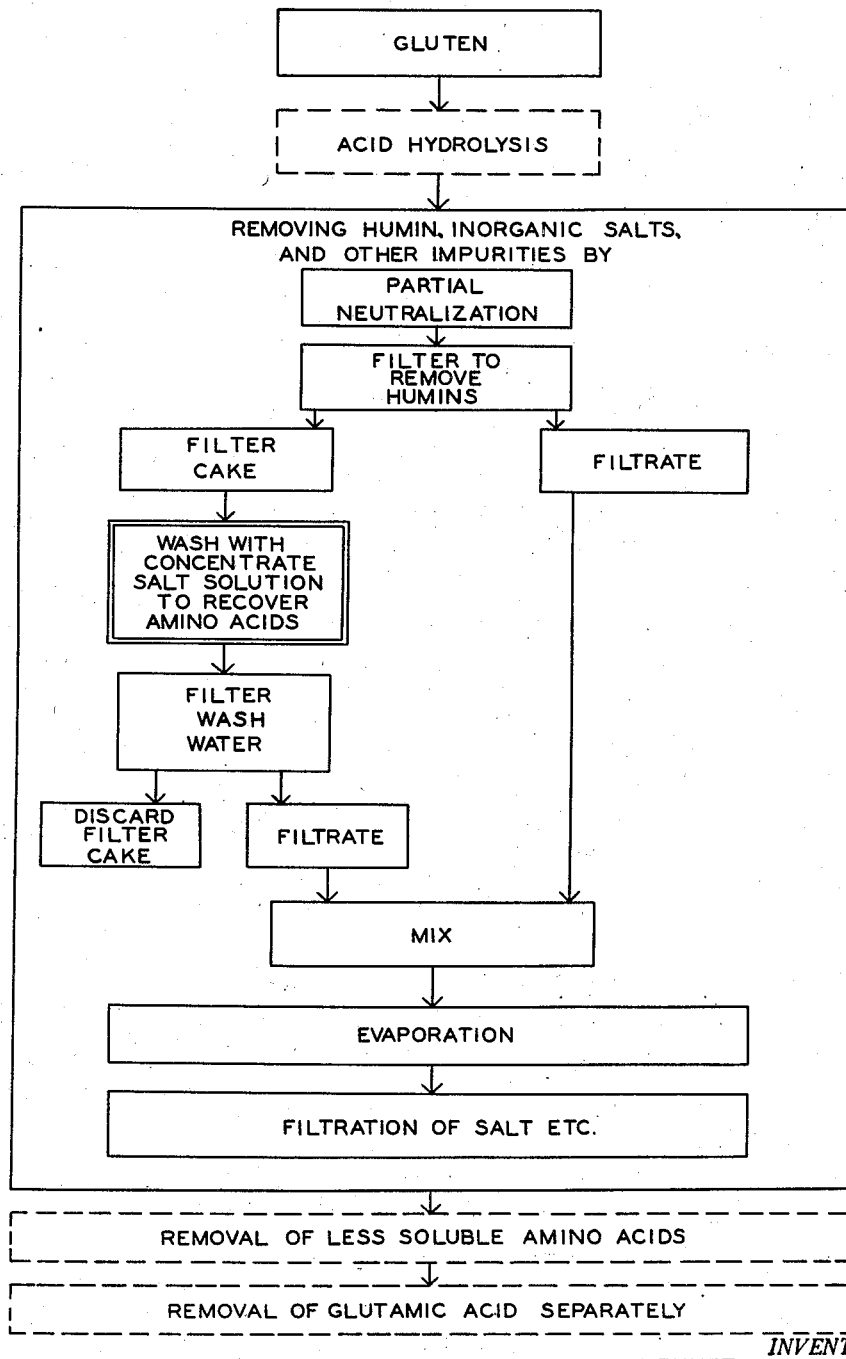
INVENTORS.
KENNETH M. GAVER
ALLAN A. EISENBRAUN
ALFRED M. BARTON
BY Jerome R. Cox
ATTORNEY

2,828,336
PROCESS FOR TREATING GLUTEN

Kenneth M. Gaver, Preville, Quebec, and Alfred M. Barton and Allan A. Eisenbraun, Montreal, Quebec, Canada, assignors to The Ogilvie Flour Mills Co., Ltd., Montreal, Quebec, Canada, a corporation of Quebec Application May 8, 1956, Serial No. 583,576

3 Claims. (Cl. 260—529)

The invention disclosed in this application relates to improvements in processes for the preparation of glutamic acid and other amino acids which are normally associated with glutamic acid in gluten; for the separation of such amino acids including separate removal of glutamic acid; and for the preparation of monosodium glutamate.

Our improved process relates especially to the preparation of glutamic acid and other amino acids from protein materials, in which process the separation and purification of the amino acids might be impeded by the presence of colloidal materials resulting from the peptization of humins and other impurities.

We have discovered that by a relatively simple change in the procedure of washing the filter cake during one step of a conventional process of preparing glutamic acid important, valuable, and unexpected results are obtained.

Our invention is illustrated by an embodiment of our invention consisting of an improvement of a well known process of treating wheat gluten. This prior art process consists (1) of treating wheat gluten so as to hydrolyze the gluten by acid to break it down to form various amino acids; (2) of thereafter removing the humin and other impurities including the salt formed by the reaction of the alkaline material and the acid of the acidic solution; (3) of removing some of the more easily removable or less soluble amino acids; (4) of removing the glutamic acid separately; and (5) of converting the glutamic acid to monosodium glutamate.

In the disclosed embodiment of our invention, we disclose the improvement of the prior art method of accomplishing the removal of the humins, inorganic salts and other impurities which consists of (a) partial neutralization of the hydrolyzed solution, (b) filtering the solution to remove humins, (c) washing the filter cake which consists of humins and probably some other impurities with a salt solution to recover from such filter cake the amino acids which may be entrapped therein without removing any of the humins or other impurities, (d) filtering the wash salt solution, (e) mixing the filtrate of the humin removal operation with the filtrate of the wash water, (f) evaporation of the mixture to crystallize the salt therein; and (g) filtration of the salt, etc., from the mixture.

Thus the invention disclosed in this application relates broadly to improvements in processes for the preparation of glutamic acid and monosodium glutamate and other amino acids from protein materials but narrowly to a method of removing the humin, inorganic salts and other impurities from hydrolized gluten and specifically to the improvement in the process of washing the filter cake of the humin removal filtration which consists of washing with a salt solution so as to more perfectly wash out and recover entrapped amino acids from said cake without removing the humins thereof.

Prior to our invention one usual way of removing the impurities referred to above consisted of the steps of (a) partial neutralization of the hydrolyzed solution, (b) filtering, (c) washing the filter cake with water, (d) filtering the wash water, (e) mixing the two filtrates, (f) evaporating the mixture, and (g) filtering the salt and remaining impurities from the mixture. Our improvement consists in using a concentrated salt solution (preferably a concentrated sodium chloride solution in step (c)) instead of washing with plain water. This change in the washing procedure is very important for the reason that the improvement in results is very appreciable. Not only is the percentage of yield thereby greatly improved but the quality of the product is much better and the cost of obtaining a product of high quality is greatly lowered.

OBJECTS

One of the objects of our invention is the improvement of the process of obtaining glutamic acid and other amino acids from protein materials.

A further more specific object of our invention is the improvement of the process of removing humins, inorganic salts, and other impurities from hydrolyzed gluten.

Further objects and features of the invention will be apparent from the subjoined specification and claims when considered in connection with the accompanying drawings illustrating one embodiment of our invention.

In the drawings:

The figure is a flow sheet showing the principal steps in a process of preparing glutamic acid and other amino acids from gluten, showing specifically in full lines a process of separating from hydrolized gluten the humins, inorganic salt and other impurities which is accomplished prior to the separation of the amino acids, and showing our specific improvement in double full lines.

DETAILED DESCRIPTION

Referring to the figure for further details we will point out that in general the flow sheet illustrates one heretofore customary method of forming glutamic acid from gluten and thereafter recovering the glutamic acid, showing however, our improvement in this process. While the figure shows one customary method of breaking a protein down into its constituent parts and of separating glutamic acid therefrom, the method of breaking the protein down and separating glutamic acid may however, be any suitable method.

(1) In the figure, acid hydrolysis is indicated. This usually comprises mixing of the component parts of the hydrolysis mixture and then heating under pressure. Generally the gluten is mixed with strong hydrochloric acid with or without additional water. The mixture of gluten and acid is then heated (generally under pressure) and thereby the gluten is broken down (with the addition of water) to peptide linkages in the molecule to form amino acids. Thereafter a part of the hydrochloric acid present forms the hydrochlorides of the amino acids thus preventing their reassociation into peptides under the influence of heat and pressure.

(2) The method of removing humin, inorganic salts, and other similar impurities is next indicated in the figure. This consists of several steps.

(a) Partial neutralization: In strongly acid solution some of the impurities which it is desirable to remove from the solution exist also as soluble hydrochlorides and so it is desirable to partially neutralize the solution with caustic soda or other suitable alkali so that these soluble substances are precipitated.

(b) Filtration of humins: The humins represent degradation products of the hydrolysis, interaction products between proteins, peptides and amino acids with the impurities existent in the original protein and finally some acid resistant impurities. These may be removed by filtration.

When the neutralized hydrolysate is filtered, however, a substantial amount of amino acids remain with the humin cake and it is impossible to get all of the liquid out from the filter cake except by washing. When the resulting humin filter cake is washed with water, a peptization of some of the humin constituents takes place and a part of the humins goes into the wash water and through the filter in colloidal form. This results in a wash water from the humin cake which is cloudy, very dark to black in color and which has the characteristic sharp smell of humins. We found that these colloidal humins interfere in the subsequent steps of manufacturing glutamic acid and monosodium glutamate.

The rate of crystallization of the preliminary amino acid fraction consisting of leucine, isoleucine, tyrosine as well as other co-precipitating amino acids is impeded by such colloidal humins. A part of the colloidal humins comes out with these amino acids, which results in a badly contaminated preliminary amino acid fraction by the black humin materials. Serious difficulties arise when a purification of this fraction is desired. The decolorization of the preliminary amino acid fractions filtrate is also seriously impeded. A large amount of activated carbon is required to accomplish decolorization.

The colloidal humins have further a most unfavorable effect on the subsequent crystallization of glutamic acid. Where there are colloidal humins, the crystallization of glutamic acid takes a long time and the resulting acid is yellow in color and has the strong smell of the humins adhering to it. The monosodium glutamate finally obtained shows a trace of yellow and grey color and still has the sharp humin smell.

When washing of the humins with water is continued, no change of the appearance of the wash water can be noted. Finally the filter clogs up and the cake upon subsequent analysis is revealed to contain significant quantities of amino acids. These can be reduced by washing somewhat in excess of reasonable commercial quantities.

(c) Washing of filter cake: As indicated above, the prior art shows no really satisfactory way of recovering the amino acids trapped in the filter cake. We have discovered that if a concentrated aqueous sodium chloride solution is used to wash the humins no peptization whatsoever takes place. The wash water coming from the humin cake has only the brown color of the hydrolysate of which a part is held back by the humins and no adverse smell can be noted. The solution has only the slight smell, characteristic for a protein hydrolysate. After prolonged washing with aqueous concentrated sodium chloride solution, the wash water is colorless and nearly free from amino acids as can be determined from amino nitrogen determination.

When washing with concentrated aqueous sodium chloride solution, the crystallization of tyrosine, leucine and isoleucine and other co-precipitating amino acids takes place in a much shorter time. The preliminary amino acid fraction is not contaminated by the black humin material. The dried fraction is much lighter in color. Purification of this fraction is easy. For the decolorization of the preliminary amino acid a much smaller amount of activated carbon is necessary.

After the sodium chloride solution wash, the subsequent crystallization of glutamic acid can be completed in much shorter time. The resulting glutamic acid is much lighter in color and is free of the disagreeable humin smell. The monosodium glutamate finally obtained does not have the yellow grey tint and also no unfavorable smell can be noted.

(d) Filtration of wash solution: In order to recover the amino acids washed from the filter cake by the sodium chloride solution, we filter the wash solution.

(e) Mixture of filtrates: We mix the filtrates from the humin separation filter step with the filtrate from the sodium chloride filter step.

(f) Evaporation: The mixed filtrate from the humin filtration and from the wash solution filtration is evaporated to such an extent that the majority of the salt added, together with that arising from the reaction in step (a) above is crystallized out of solution.

(g) Filtration of salt: The crystallized salt is then removed by appropriate filtration.

(3) Removal of less soluble amino acids: The filtrate is then adjusted to the pH at which tyrosine, leucine and isoleucine as well as various other co-precipitating amino acids are least soluble and the filtrate is held at this point until these amino acids crystallize. These crystallized amino acids are removed by appropriate filtration since their presence in the system would interfere with the separation of glutamic acid.

(4) Removal of glutamic acid: The filtrate is decolorized with activated carbon. The filtrate is then adjusted to the isoelectrical point (equal charge intensity of basic and acidic groups) of glutamic acid. The glutamic acid is allowed to crystallize usually with the aid of refrigeration, the other amino acids remaining in solution. The separated glutamic acid is then filtered off from the mother liquor which may or may not be reworked to recover the last possible quantities of glutamic acid.

(5) Conversion into monosodium glutamate: The crude glutamic acid is suspended in clean water and one of the two carboxyls of the glutamic acid is neutralized with caustic soda to form monosodium glutamate. The solution of monosodium glutamate is decolorized and filtered by appropriate means. The purified monosodium glutamate solution is crystallized, the crystals separated, dried and packed.

The following Examples I and III are specific examples of the application of our invention to practical conditions. It will be understood that the procedures given are illustrative and typical and are not to be regarded as limiting the invention to the specific data given, the intention being to cover all equivalents and all modifications within the scope of the appended claims.

*Example I*

To 400 grams of wheat gluten, 900 grams of 20% aqueous hydrochloric acid solution were added and the same hydrolyzed under autogeneous pressure at a temperature of 140° C. over a period of 2½ hours. The reaction product was cooled to room temperature and then neutralized with 50% aqueous sodium hydroxide solution to pH 6.2. The neutralized liquor was filtered from the humins using vacuum and a glass fritted Buchner funnel of 350 ml. capacity.

The filtered humin cake was washed thoroughly with 216 ml. of hot concentrated sodium chloride solution. After so washing, the sodium chloride wash solution was filtered. In so filtering, vacuum was applied and the filter cake was pressed with a glass stopper in order to suck as dry as possible. The filtrates were combined and evaporated in vacuo whereby a large amount of sodium chloride crystallized. This was filtered off.

The resulting solution was adjusted with hydrochloric acid to the pH at which tyrosine, leucine, isoleucine and other co-precipitating amino acids are least soluble and the solution held at this point under refrigeration until these amino acids precipitated, which precipitation was complete in 24 hours. These amino acids were filtered out.

The filtrate was decolorized with activated carbon. Hydrochloric acid was added to the decolorized filtrate so as to bring the system to the isoelectrical point of glutamic acid. The whole solution was refrigerated allowing glutamic acid to crystallize, the crystallization thereof being complete in several hours.

Aqueous sodium hydroxide was added to the glutamic acid so obtained in an amount equal to the neutralization of one carboxy group of glutamic acid. The resulting monosodium glutamate solution was treated with activated carbon and again filtered. The resulting filtrate was evaporated and the monosodium glutamate crystals so obtained were separated by filtration. The monosodium glutamate so obtained was pure white in color and did not have any smell.

EXPERIMENTAL

In order to compare our improved process with the prior art processes we performed further experiments as follows:

Example II

To 400 gms. of wheat gluten 900 gms. of 20% aqueous hydrochloric acid solution were added and the mixture hydrolyzed under autogeneous pressure at a temperature of 140° C. over a period of 2½ hours. The reaction product was allowed to cool and then neutralized to pH 6.2 with 50% sodium hydroxide solution. The so neutralized reaction product was filtered, thus removing the humin material formed during hydrolysis. The filtration was carried out using vacuum and a glass fritted Buchner funnel of 350 ml. capacity. After filtration the filter wet humins were analyzed for amino nitrogen using Van Slyke's method. 24.3 mg. amino nitrogen/gm. filter wet humins were obtained.

The humin filter cake was washed with 216 ml. of hot water thoroughly, applying vacuum and pressing the filter cake down with the help of a glass stopper in order to suck them as dry as possible. Then the so obtained filter was redispersed in 172 ml. of hot water and filtered, using vacuum and pressing the cake down well. Analysis of the filtered wet humin cake, at this point, by paper chromatography showed 0.5% glutamic acid. Subsequent further washing of the humin cake was not possible as the filter clogged up. The total humin and wash water was very dark to black in color and had the characteristic disagreeable sharp humin smell. The filtrates were combined, evaporated in vacuo whereby a substantial amount of the sodium chloride crystallized out of solution and the solution was then filtered. The filtrate was adjusted to the pH at which tyrosine, leucine, isoleucine as well as other amino acids, are least soluble and the filtrate held at this point until these amino acids precipitated. This operation required two days. Amino acids obtained in this way were dark in color and had the disagreeable humin smell. When these amino acids were dissolved in water, a black, bad smelling residue was obtained, which indicated, that a part of the colloidally dispersed humins precipitated at this stage.

The filtrate was decolorized. A large amount of activated carbon was necessary to accomplish this. But even after decolorization, the disagreeable humin odor persisted. To the decolorized filtrate hydrochloric acid was added in order to bring the whole system to the isoelectrical point of glutamic acid. Glutamic acid was allowed to crystallize, refrigeration being applied to aid the process. The glutamic acid came slowly out of solution. The operation required several days. The crystallized glutamic acid was filtered. It was yellow brown in color and had the penetrating bad humin odor adhering to it. To the so obtained glutamic aqueous sodium hydroxide solution there was added in an amount equal to the neutralization of one carboxyl group of glutamic acid. The resulting solution was treated with activated carbon and again filtered. The solution was then evaporated whereby monosodium glutamate crystallized and the crystals separated by filtration and then dried. The monosodium glutamate obtained showed a trace of yellow to grey color and had still a disagreeable sharp odor.

Example III

To 400 gms. of wheat gluten, 900 gms. of 20% aqueous hydrochloric acid solution was added and the same hydrolyzed under autogeneous pressure at a temperature of 140° C. over a period of 2½ hours. The reaction product was cooled to room temperature and then neutralized with 50% aqueous sodium hydroxide solution to pH 6.2. The neutralized liquor was filtered from the humins in the same way as in Example II. Analysis of the filter cake using Van Slyke's method showed 25.0 mg. amino nitrogen/gm. of filter cake.

The filtered humin cake was washed in same way as in Example I with 216 ml. of hot concentrated sodium chloride solution. Then the cake redispersed in 172 ml. concentrated sodium chloride solution and filtered in exactly the same way as in Example II. The resulting humin cake was analyzed for glutamic acid by paper chromatography. No glutamic acid could be found. The humin cake was again washed with 200 ml. hot concentrated sodium chloride solution. The washing was easy. No clogging of the filter occurred. The first wash water from the humins was very light brown, clear and had only the characteristic smell of a protein hydrolysate. No sharp humin smell could be noted. The subsequent washings were from straw yellow to colorless, having hardly any smell. The humin cake after the last wash was analyzed for amino nitrogen. None could be determined by Van Slyke's method which showed that the humin was free of amino acids resulting from protein hydrolyses. The filtrates were combined and evaporated in vacuo whereby a large amount of sodium chloride crystallized. This was filtered off.

The resulting solution was adjusted with hydrochloric acid to the pH at which tyrosine, leucine, isoleucine as well as other amino acids are least soluble and the filtrate held at this point until these amino acids precipitated, refrigeratoin being applied to aid the process. Contrary to our Example II this operation was complete after 24 hours. The amino acids were filtered. They were much lighter in color than those obtained in our Experiment No. II. When this fraction was dissolved in water no black insoluble residue was obtained which indicated the absence of humin material in this fraction. The fraction as a whole did not have the disagreeable humin smell.

The filtrate was decolorized with activated carbon. Only a fraction of the amount of carbon black required in Example I was required in order to accomplish this operation. To the decolorized filtrate hydrochloric acid was added so as to bring the system to the isoelectrical point of glutamic acid. The whole solution was refrigerated allowing glutamic acid to crystallize. The crystallization was complete in several hours. In Example No. II the same operation required several days. The resulting glutamic acid was light yellow-grey in color and did not have the disagreeable sharp humin odor.

To the glutamic acid so obtained, aqueous sodium hydroxide was added in an amount equal to the neutralization of one carboxyl group of glutamic acid. The resulting monosodium glutamate solution was treated with activated carbon and again filtered. The resulting filtrate was evaporated whereby monosodium glutamate crystallized. The obtained crystals were separated by filtration. The monosodium glutamate obtained was pure white in color and did not have any smell.

Example IV

To 400 gms. of gluten, 800 gms. of 37% aqueous hydrochloric acid was added and the mixture hydrolyzed, cooled and neutralized under the same conditions as in Examples No. II and No. III. By this procedure an amount of sodium chloride was formed that did not entirely dissolve in the reaction mixture. On subsequent filtration the undissolved sodium chloride remained with the humins in the filter cake.

When this filter cake was washed with a relatively small amount of hot water, the wash water was light brown and clear, free from colloidal humins. No humin smell of the wash water could be noted. When, however, a greater volume of wash water was used, a part of the humins redispersed to give a colloidal solution which resulted in a cloudy black wash water with the typical unpleasant humin odor. Finally clogging of the filter resulted. When only 100 ml. of hot water were used, the humin cake still contained a substantial amount of glutamic acid and other amino acids. In the subsequent steps of the procedure the same results were obtained as in Example No. III. However, when a larger amount of hot water was used to wash the filter cake the colloidal humin formed which contaminated the liquor and the same results were obtained as illustrated in Example No. II.

GENERAL

The scope of our invention is considerable. When humins are washed with concentrated sodium chloride solution instead of water, a better quality glutamic acid and monosodium glutamate is obtained. The tyrosine and leucine fraction has a much higher purity, being without humin contamination. The rate crystallization of these more easily removable amino acids and also of glutamic acid, is greatly increased.

Our theory by which we explain the unexpected valuable results obtained by our simple change in procedure is as follows:

Up to now, one way of preventing the formation of colloidal humins was to use a large excess of acid for hydrolysis as outlined in our Example No. IV. On neutralization a large amount of sodium chloride formed; a part of which did not dissolve in the reaction mixture. On filtration, solid sodium chloride was removed together with the humins. On washing with small amounts of water, a concentrated sodium chloride solution formed in the cake, thus preventing the peptization of the humins. However, when large amounts of water were used, the concentration of sodium chloride in the liquid surrounding the humins decreased until it was no longer effective in preventing the peptization and a wash water containing colloidal humins resulted.

When normal amounts of acid are used for hydrolysis and the filtered humins are not washed at all in order to avoid formation of colloidal humins, a substantial amount of glutamic and other amino acids remains with the humins and the yield of monosodium glutamate from wheat gluten drops sharply. When the hydrolysis is carried out with a large excess of acid as in our Example No. IV and the resulting filtered humins are washed with only a small amount of water, no peptization occurred, but also a large amount of amino acids including glutamic remained with the humins. This resulted also in a decrease of yield of monosodium glutamate from wheat gluten. Also the large amount of hydrochloric acid increases the costs of the process considerably.

Humins are the reaction products arising from the non-protein constituents of a protein material such as wheat gluten and from the interaction of these constituents with amino acids during hydrolysis of the said protein material. Under the influence of an electrolyte the humins combine the colloidal aggregates which can be removed by filtration.

In a normal neutralized hydrolysate the concentration of sodium chloride is quite high because of the sodium chloride formed in the partial neutralization step. After filtration of the neutralized hydrolysate a part of the liquid remains with the humins. The high concentration of sodium chloride in this liquid prevents the peptization of the humins. However, washing with water, this liquid is replaced by water and the concentration of sodium chloride in the liquid surrounding the humins decreases constantly. Below a certain concentration of electrolyte (e. g. sodium chloride) peptization starts, which results in the formation of colloidal humins going through the filter.

On the other hand, when a concentration of electrolyte (e. g. a concentrated sodium chloride solution) is used to wash the humins the concentration of electrolyte surrounding the humins is always high so that no peptization will occur.

It is a well known fact that electrolytes will destroy colloidal solution or prevent their formation. Therefore it can be readily seen that all kinds of electrolyte solutions such as sodium sulphate, potassium chloride, potassium carbonate, sodium nitrate, ammonium chloride, calcium chloride and many others can be used with similar results. So it may be readily seen that in our case sodium chloride serves only as an illustration and is not specific in its application. We prefer to use sodium chloride solution as this salt will interfere least in the process of manufacturing glutamic acid and monosodium glutamate when hydrolysis is carried out with hydrochloric acid and sodium hydroxide is used for neutralization of the acid hydrolysate.

We suggest that one reason the prior art has led away from our discovery is that workers in the field knew it was necessary to remove the salt formed by the hydrolyzing acid and the neutralizing alkali and therefore it seemed absurd to them to add more salt. Therefore our discovery was unobvious to them and was unexpected.

It is to be understood that the above described embodiment of our invention is for the purpose of illustration only and various changes may be made without departing from the spirit and scope of the invention.

We claim:

1. In a process for the treatment of gluten in which the gluten is hydrolyzed with an acid to break it down to form various amino acids, thereafter humin, inorganic salts, and other impurities are removed, thereafter amino acids less soluble than glutamic acid are removed, and thereafter glutamic acid is separately removed, the method of removing the humin, inorganic salts and other impurities which consist of partially neutralizing the mixture; filtering to remove the humins; washing the filter cake with a hot concentrated inorganic salt solution to recover the amino acids trapped in the filter cake; filtering the wash water; adding the two filtrates; evaporating to crystallize the inorganic salts and filtering to remove such salts and other impurities.

2. In a process for the treatment of gluten in which the gluten is hydrolyzed with an acid to break it down to form various amino acids, thereafter humin, inorganic salts, and other impurities are removed, thereafter amino acids less soluble than glutamic acid are removed, and thereafter glutamic acid is separately removed, the method of removing the humin, inorganic salts and other impurities which consist of partially neutralizing the mixture; filtering to remove the humins; washing the filter cake with hot concentrated sodium chloride solution to recover the amino acids trapped in the filter cake; filtering the wash water; adding the two filtrates; evaporating to crystallize the inorganic salts and filtering to remove such salts and other impurities.

3. In a process for the treatment of gluten in which the gluten is hydrolyzed with hydrochloric acid under pressure to break it down to form various amino acids, thereafter humin, inorganic salts, and other impurities are removed, thereafter amino acids less soluble than glutamic acid are removed, and thereafter glutamic acid is separately removed, the method of removing the humin, inorganic salts and other impurities which consist of partially neutralizing the mixture to pH of approximately 6.2; filtering under vacuum to remove the humins; washing the filter cake with hot concentrated sodium chloride solution to recover the amino acids trapped in the filter cake; filtering the wash water under vacuum; adding the two filtrates; evaporating to crystallize the inorganic salts and filtering to remove such salts and other impurities.

References Cited in the file of this patent

UNITED STATES PATENTS 2,347,220    Shildneck            Apr. 25, 1944